United States Patent Office 3,706,694
Patented Dec. 19, 1972

3,706,694
CATALYTIC HYDROCRACKING
Dean Arthur Young, Yorba Linda, Calif., assignor to Union Oil Company of California, Los Angeles, Calif.
No Drawing. Continuation-in-part of application Ser. No. 761,321, Sept. 20, 1968, which is a continuation-in-part of application Ser. No. 681,561, Nov. 8, 1967. This application Mar. 9, 1970, Ser. No. 17,974
Int. Cl. B01j 11/40
U.S. Cl. 252—455 Z
19 Claims

ABSTRACT OF THE DISCLOSURE

A method for preparing crystalline aluminosilicate zeolite catalysts having a low alkali metal content in the zeolite and containing (1) a polyvalent metal cation, preferably an iron group metal and (2) a hydrogenation component, comprises pre-calcining or pre-steaming the polyvalent metal containing zeolite prior to addition of the hydrogenation component. The invention also includes the subsequent introduction of additional stabilizing element following the pre-calcining or pre-steaming but prior to addition of the hydrogenation component. The catalysts find particular utility in hydrocracking and hydrotreating processes.

---

This application is a continuation-in-part of application Ser. No. 761,321, filed Sept. 20, 1968, now abandoned which was a CIP of Ser. No. 681,561, filed Nov. 8, 1967, now abandoned.

This invention concerns the preparation of crystalline zeolite catalysts having improved activity and stability. Improved stability is evidenced by the retention of a larger proportion of the original structure of the zeolite after successive hydrations and recalcinations. This stability is desirable in catalysts which are subjected to regenerations, attack by anionic or acid-forming elements, and contact with ions which remove desirable cations from the zeolite structure. For example, addition of hydrogenation components such as molybdenum and tungsten tends to have a destablizing effect on the catalyst structure.

Zeolites having low, i.e., less than about 3 percent, alkali metal content are conventionally prepared by conversion of the alkali metal form of the zeolite to the ammonium form. This ammonium form is then converted to the hydrogen form by calcination. It is well known that the hydrogen forms of zeolites, such as synthetic types A, X, and Y, are unstable, the crystalline structures being destroyed by calcination, rehydration, and contact with acidic solutions. I have found that catalysts prepared with these zeolites should contain at least one polyvalent metal cation, preferably iron, cobalt or nickel. Although the exact mechanisms by which these cations improve the properties of these catalysts are not known with certainty it is believed that their presence tends to stabilize the resultant compositions, i.e., render them less susceptible to degradation, as well as contribute to the activity, particularly the hydrogenation activity of the finished catalyst.

It has now been found that the stability and activity of such zeolite catalysts may be substantially increased by calcination or steaming after addition of the polyvalent metal cation but prior to addition of the hydrogenation component.

It is believed that the permanent stabilization of the invention may relate to two effects. Thermal activation may cause the polyvalent metal cation to become attached to normally inaccessible sites where it is not replaced by other cations. Secondly, calcination dehydrates the cation and the anionic exchange sites causing the formation of direct metal-oxygen-aluminum bonds. It is believed that this combination with the stabilizing element is not readily hydrolyzed. Consequently the stabilizing cation becomes fixed in the zeolite structure and the combination resists hydrolysis and exchange.

Crystalline aluminosilicate zeolites are conventional and include the natural zeolites faujasite, mordenite, erionite and chabazite and synthetic zeolites A, L, S, T, X and Y. Zeolites X, Y and L are described in U.S. Pats. 2,882,244, 3,130,007 and 3,216,789. These crystalline zeolites are metal aluminosilicates having a crystalline structure such that a relatively large adsorption area is present inside each crystal. They consist basically of three-dimensional frameworks of $SiO_4$ and $AlO_4$ tetrahedra with the tetrahedra cross-linked by the sharing of oxygen atoms. The electrovalence of the tetrahedra containing aluminum is balanced by the inclusion in the crystal of cations, for example, metal ions, ammonium ions, amine complexes, or hydrogen ions. The spaces in the pores may be occupied by water or other adsorbate molecules.

Normally, the crystalline zeolites occur, or are prepared, in the sodium or potassium form. The ammonium form of the zeolite is prepared by ion exchange of the sodium or potassium form with an ammonium salt to replace most or all of the sodium or potassium. This procedure for preparation of the ammonium form of zeolites is also conventional and is described in U.S. Pat. No. 3,130,006.

The zeolites presently preferred for application within the concept of this invention are those having relatively large pore sizes, i.e., 5 angstroms or greater, generally characterized as being sufficient to admit the ingress and egress of isoparaffins to and from the interior of the zeolite. Illustrative of zeolites within this class are zeolites L, T, X, Y, mordenite, and the like. The desirability of employing larger pore size zeolites derives from the improved product distributions which result from their use, particularly in hydrocracking applications. Understandably the larger pore openings facilitate the migration of larger hydrocarbon molecules into the zeolites. The natural and synthetic faujasite type zeolites, e.g., zeolites X and Y are presently particularly preferred.

The polyvalent metal cations employed within the concept of this invention are preferably selected from the bi- and trivalent metal cations particularly iron, cobalt, nickel, magnesium, calcium, manganese and the rare earth metals, i.e., the metals of the lanthanide series particularly cerium, lanthanum, praseodymium and neodymium. Zeolites can contain any one or a combination of these cations prior to calcination. The cations presently particularly preferred are the iron group metals, especially cobalt and nickel due to the improvements in stability and activity occassioned by the use of these cations. It is presently preferred that these cations be incorporated into the ammonium or hydrogen form of the zeolite, i.e., after exchange of the alkali metal form of the zeolite with ammoniacal or mildly acidic solutions and/or partial calcination of the ammonium form sufficient to convert the same to the corresponding hydrogen form. Nevertheless, they can also be incorporated directly into the alkali metal form of the zeolite by conventional exchange procedures.

The polyvalent metal cations are generally incorporated into the ammonium or hydrogen form of the zeolite in the form of a cation using conventional exchange procedures. They can be incorporated by base-exchange with an aqueous solution of the metal salt or a suitable cationic complex such as the tetramine or hexamine. Suitable salts are, e.g., nitrates, acetates, carbonates, chlorides, bromides and sulfates. The base exchange is conducted for a period of time and at a temperature suitable to replace at least 20 percent, preferably at least about 50 percent, of the ammonium or alkali metal cations of the zeolite. Proportions of these cations will range from about 2 to 15 percent by weight, preferably about 4 to 8 percent determined as the corresponding oxides. Following this exchange the product may be predried or directly transferred to the calcination or steaming vessel.

The polyvalent cation containing zeolite is then stabilized by calcining or steaming at a temperature of from about 500 to 1800° F., for a period of about ½ to 30 hours, preferably about 4 to 16 hours. Calcination may be effected in air or oxygen alone or mixed with water vapor. When steaming is employed the zeolite is treated with about 2 to 20 p.s.i.a. steam, which may be either static or passed in a stream over the zeolite. The preferred temperature for steaming is about 900 to 1200° F.

Calcination, i.e., heating to elevated temperature in the substantial absence of water vapor, has generally been found to give results superior to those obtained by steaming. The preferred temperature for calcination is from about 1200 to 1800° F. Optimum calcination temperature within this approximate range will vary with the type of zeolite base, the specific cationic form and hydrogenation component employed, the type of reaction in which the catalyst is employed, etc., and is best determined ex-perimentally. Generally, however, it has been found that calcination below, but within about 100 to 200° F. of, the decomposition temperature of the zeolite gives best results.

In addition, it has been found that a two-step calcination procedure may even further enhance the activity of the catalysts. In this procedure the exchanged zeolite is first calcined at a temperature of about 600 to about 1300° F. and is then further calcined at a higher temperature of about 1400 to about 1800° F., with or without cooling between the successive calcinations. In addition, the exchanged zeolite can be calcined or steamed as described followed by further exchange with the same or a similar cation of the prescribed class of polyvalent cations to increase the cation concentration of the zeolite and reduce the alkali metal content thereof while enhancing the activity and stability of the resultant compositions. Multiple exchange-calcination cycles of this nature can be employed if desired.

The hydrogenation components include the metals, oxides and sulfides of Groups V, VI and VIII of the Periodic Table. Specific examples include vanadium, chromium, molybdenum, tungsten, iron, cobalt, nickel, platinum, palladium and rhodium or any combination of these metals or their oxides or sulfides. The Group VI metals, oxides and sulfides are presently preferred, particularly in midbarrel hydrocracking applications, the molybdenum and tungsten derivatives being most preferred due to their superior activity. Amounts of the hydrogenation component will usually range from about 0.1% to 20% by weight of the final composition based on free metal. Generally, optimum proportions of the Group V and VI metals and compounds will range from about 2 to 20%. Molybdenum in the form of the sulfide is especially preferred as the hydrogenation component. When a metal of the platinum series is employed, the amount thereof will generally range from about 0.01 to 5 weight percent preferably 0.1 to 2 weight percent based on the free metal.

It has also been found that the stability and activity of the catalyst may be improved by the addition of further amounts of the same or a dissimilar cations following the pretreatment, i.e., following the calcining, steaming, or both. This addition is accomplished in the same manner as the initial incorporation of the stabilizing element, i.e., by means of the conventional exchange procedures described above. The exchange is conducted for a period of time and at a temperature sufficient to replace about 30 to 80 percent of the alkali metal and/or hydrogen ions remaining in the zeolite. The resultant zeolite will contain from about 2 to 15, preferably 4 to 8 percent by weight of the polyvalent cation determined as the corresponding oxide. Following this additional exchange the product is dried, or dried and calcined, prior to addition of the hygenation component.

Following calcination of the polyvalent cation form of the zeolite, and either before or after inclusion of the Group VIII or Group VI metal hydrogenation component, the zeolite can be formed into a particulate form by extrusion or pelleting suitable for the intended application. Ion exchange of the zeolite is preferably accomplished when the zeolite is in a finely dispersed powder form so as to facilitate mass transfer. Similar considerations may also be taken into account when designing procedures for incorporating the additional hydrogenation components, i.e., the Group VI and Group VIII metals, oxides, or sulfides. As a general rule, if these latter constituents are also to be incorporated by ion exchange, such exchange is also preferably effected while the zeolite is in a finely dispersed powder form. Nevertheless, these hydrogenation components can be added by mechanical admixture with insoluble forms of those components after fabrication of the zeolite powder into larger particulate forms. In any event, the resultant powder composite is preferably either pelleted or extruded to produce catalyst particles of the desired shape, size, density and structural stability. For application in most hydrocarbon conversion processes, e.g., hydrocracking, cracking, hydrofining, isomerization, reforming, hydrogenation and the like, catalyst extrudates or pellets are generally suitable.

Due to the generally inferior binding properties of zeolites alone, it is usually preferred to incorporate into the zeolite powder about 5 to about 40 weight percent of a binding agent such as alumina or silica-stabilized alumina preferably introduced as a form of a hydrogel or sol. However, mixed oxides such as silica-alumina, silica-magnesia and the like, are also suitable for these purposes. Binders of this nature are discussed in more detail in the prior art exemplified by British Pat. 1,056,301.

The advantages of this invention are not limited to compositions comprising predominantly the zeolite constituent of the resulting combination. The zeolite may comprise only a minor proportion of the final combination. For example, active compositions may weigh as little as about 2 weight percent of the zeolite. The catalytic properties of these latter compositions will of course deviate from those of the compositions containing higher amounts of zeolites. For example, compositions containing minor amounts of these zeolites will exhibit a lower preference for gasoline range hydrocarbons and a higher selectivity for midbarrel range fuels. They will also exhibit lower overall degrees of hydrocracking in low severity operations wherein the primary objective is hydrofining, e.g., denitrogenation and desulfurization.

The catalyst pellets are then dried and activated by calcining in an atmosphere that does not adversely affect the catalyst, such as air, nitrogen, hydrogen, helium, etc. Generally, the dried material is heated in a stream of dry air at a temperature of from about 500° F. to 1500° F., preferably about 900° F., for a period of from about ½ to 12 hours, preferably about 2 hours, thereby converting the metal constituents to oxides and converting the ammonium zeolite to the hydrogen form.

In addition, the catalysts are preferably further activated by presulfiding with a sulfur donor such as hydrogen sulfide, carbon disulfide, elemental sulfur and hydrocarbon thiols and thioethers to convert the metal constituents of the catalyst to the corresponding sulfides. This is readily accomplished, e.g., by saturating the catalyst pellets with hydrogen sulfide for a period of from about 30 minutes to 2 hours. These procedures are described in more detail in U.S. Pat. 3,239,451.

The feedstocks which may be treated using the catalyst of the invention include in general any mineral oil fraction boiling above about 200° F., usually above the conventional gasoline range, i.e., about 300° F., and generally above about 400° F. The end boiling points of such feeds usually range up to about 1200° F. Exemplary of such feeds are straight run gas oils, light and heavy naphthas, coker distillate gas oils, reduced crude oils, cycle oil derived from catalytic or thermal cracking operations, topped crudes etc. These fractions may be derived from petroleum crude oils, shale oils, tar sand oils, coal hydrogenation products, and the like. Any of these hydrocarbons or mixtures thereof containing sulfurous or nitrogenous hydrocarbons can be employed in processes utilizing the catalyst of this invention to effect hydrofining of those feeds. However, feed stocks most commonly employed in hydrofining and hydrocracking operations are those boiling above about 400° F. and up to about 1200° F. usually up to about 1000° F. having API gravities within the range of about 20 to about 35. The concentration of acid soluble constituents, e.g., aromatics and olefins, in such hydrocracker feedstocks is usually in excess of about 30 volume percent.

Hydrocarbons can be converted by contacting with the catalyst of this invention under a wide variety of conditions in either fixed bed or fluid, catalytic systems. Contacting temperatures are usually within the range of 500 to 900° F., preferably about 650 to about 850° F. This latter narrower temperature range is particularly attractive for the production of gasoline and midbarrel range hydrocarbons in hydrocracking systems. When hydrocracking is the preferred reaction, pressures should be reltaively elevated, i.e., within the range of about 1000 to about 3000 p.s.i.g., preferably 1500 to about 2500 p.s.i.g., and the reaction should be conducted at liquid hourly space velocities within the range of about 0.1 to about 10, preferably 0.2 to about 5, in the presence of hydrogen added at a rate of at least about 500, and preferably about 5000 to 15,000 standard cubic feet per barrel of feed. Less severe conditions should be employed when it is desirable to effect primarily hydrofining while minimizing the degree of molecular weight reduction attributable to hydrocarcking. However, the most favorable hydrofining conditions fall within the ranges described above. The most desirable balance of these two conversion mechanisms, i.e., hydrofining and hydrocracking, will also be affected, in degree, by the characteristics of the feedstock employed and can be best determined empirically simply by operating at several sets of conditions and analyzing the resultant products.

A particularly attractive catalyst envisioned in the scope of this invention can be prepared by exchanging an ammonium zeolite Y with an excess of a solution of one or both of cobalt or nickel salts such as the nitrates, sulfates and carbonates, the nitrates being particularly preferred, under conditions sufficient to incorporate at least about 0.5 weight-percent of the corresponding metal compound into the aluminosilicate based on the weight of the corresponding element. This can be conveniently effected by contacting the aluminosilicate, preferably containing less than 2 weight-percent of the original alkali metal based on the corresponding oxide, with at least a two fold excess of exchange solution having at least a 0.1 molar, preferably 0.2 to 3 molar concentration of the selected metal salt. The term excess solution is herein intended to mean that the amount of solution employed should be at least about twice that of the bulk volume of the aluminosilicate treated. Contacting should be continued for at least about 5, preferably at least about 20 minutes with agitation to assure adequate contacting of the aluminosilicate with the exchange solution. The exchange reaction can also be accelerated by contacting at elevated temperatures, i.e., up to about 200° F. Higher temperature can of course be employed if it is not inconvenient to operate the system under pressure. However, temperatures substantially above this level are not necessary in this procedure.

It is presently preferred that the exchange procedure be repeated at least once to effect the further removal of alkali metal and ammonium cations from the aluminosilicate and the substitution of cobalt and/or nickel therefore. Three or more exchanges of this nature can also be employed. After each exchange, the aluminosilicate is preferably washed free of exchange solution prior to contacting with the next exchange medium. The zeloite can also be subjected to calcination intermediate the exchange steps.

In this preferred procedure the calcined aluminosilicate is then mechanically admixed with additional substantially undissolved nickel and/or cobalt in the form of a thermally decomposable salt thereof such as nickel carbonate, cobalt nitrate, nickel sulfate and the like in addition to a thermally decomposable molybdenum compound such as ammonium heptamolybdate, ammonium phosphomolybdate, molybdenum trioxide and the like, under conditions such that the molybdenum compound is relatively insoluble, i.e., in the absence of substantial amounts of water. The amount of added nickel, cobalt and molybdenum compounds should be sufficient to provide a finished catalyst containing about 2 to about 15, preferably about 4 to about 8 weight-percent of the corresponding nickel and/or cobalt oxides, and about 2 to about 20 weight percent molbdenum oxide.

It is also preferable to incorporate at least about 2 and preferably about 5 to about 70 weight percent, generally about 5 to about 30 weight percent of a peptized alumina or silica stabilized alumina binder. Peptized alumina binders are generally well known in the art for binding aluminosilicate compositions and are readily prepared by exposing the alumina to a mildly acidic solution of a strong mineral acid such as nitric or sulfuric acids and the like for a period of at least about 5 minutes.

The combined constituents, i.e., the aluminosilicate, peptized alumina binder, and added metal compounds are mechanically admixed, for example, in a pan muller, for a period sufficient to effect the intimate admixture of all of these constituents, i.e., at least about 10 minutes, preferably about 15 minutes to about 1 hour. The resultant combination is then formed into the desired shape by either extrusion or pelleting. The extrudates or pellets are then dried and calcined at a temperature preferably within the range of 500 to 1500° F. in the presence of an oxidizing atmosphere for a period sufficient to convert the metal constituents to the corresponding oxides. The resultant calcined catalyst is then sulfided by contacting preferably with hydrogen sulfide or carbon bisulfide either prior to introduction into the conversion unit or in situ in the unit.

The process of this invention may be carried out in any equipment suitable for catalytic operations. It may be operated batchwise or continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed. After hydrocracking, the resulting products may be separated from the remaining components by conventional means such as adsorption or distillation. Also, the catalyst after use over an extended period of time may be regenerated in accordance with conventional procedures by burning off carbon in an oxygen-containing atmosphere under conditions of elevated temperature.

While the foregoing description has centered mainly upon hydrocracking or hydrotreating processes, the catalysts described are also useful in a variety of other chemical conversions, and generally, in any catalytic process requiring a hydrogenating and/or acid function in the catalyst. Examples of other reactions contemplated are hydrogenation, alkylation (of isoparaffins with olefins, or of aromatics with olefins, alcohols or alkyl halides), isomerization, polymerization, reforming (hydroforming), carbonylation, hydrodealkylation, hydration of olefins, transalkylation, etc.

The following examples will serve to more particularly illustrate the preparation of the catalysts of this invention and their advantageous properties in hydrocracking operations.

EXAMPLES 1-4

A cobalt zeolite Y was prepared as follows:

Ammonium zeolite Y, 2100 g. containing 1.8% $Na_4O$, was slurried in 2000 ml. 0.5 M $Co(NO_3)_2$. The slurry was stirred and heated to boiling for two hours. Then the zeolite was collected by filtration and washed with 1000 ml. water. The exchange and washing were repeated three times. Then the cobalt zeolite was dried to 31.7% moisture.

Four catalyst bases were then prepared by treatment of 293 g. portions of the thus-prepared cobalt zeolite Y according to the following examples:

Example 1: Cobalt zeolite Y was dried 16 hours at 140° F.

Example 2: Cobalt zeolite Y was dried 16 hours at 140° F. and then heated to 500° F. for 6 hours.

Example 3: Cobalt zeolite Y was dried 16 hours at 140° F., heated to 500° F. for 6 hours, and then heated to 1200° F. for 6 hours.

Example 4: Cobalt zeolite Y was dried 16 hours at 140° F., heated to 500° F. for 6 hours, and then heated to 900° F. in an atmosphere of steam for 16 hours.

An alumina binder for the catalysts was prepared as follows:

Boehmite alumina, containing 22% moisture, was mixed with 0.15 N $HNO_3$. The proportions were 525 g. alumina in 1215 ml. acid. The mixture was aged overnight to form peptized boehmite and basic aluminum nitrate.

Each of the catalyst bases of Examples 1–4 were combined with the same quantities of materials by the same procedure as follows:

The base was placed in a pan muller with 10.7 g. $NiCO_3$, 41.2 g. $Ni(NO_3)_2 \cdot 6H_2O$, and 61.0 g.

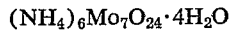

The mixture was dry mulled for 30 minutes. Then a 343 g. portion of the boehmite alumina sol was added and mulling continued until the mixture appeared uniform. Finally, sufficient water was added to form an extrudable paste. The following list gives the quantities of water added to each preparation prior to extrusion:

| | |
|---|---|
| Example 1 | None |
| Example 2 ml | 30 |
| Example 3 ml | 40 |
| Example 4 ml | 55 |

The mulled pastes were extruded as 1/16-inch diameter rod and dried overnight at room temperature. The extrudates were broken into 1/8 to 1/4-inch lengths and then dried 2 hours at 220° F. The catalysts were then activated by heating in a rotary calciner according to the following schedule:

| | Hours |
|---|---|
| 500 to 600° F. | 2 |
| 600 to 800° F. | 2 |
| 800 to 875° F. | 2 |

Crystalline stabilities were determined by measuring the summed intensities of the X-ray diffraction patterns before calcining (activating) and after calcining, rehydrating and recalcining at 1000° F. Table 1 compares the fractions of original structure remaining after this severe treatment.

TABLE 1

| | | Summed X-ray intensity | | Loss of structure, percent | Original structure remaining percent |
|---|---|---|---|---|---|
| Example | Pretreatment | Uncalcined | Calcined, rehydrated, recalcined | | |
| 1 | Dried 140° F | 84 | 61 | 27 | 73 |
| 2 | Dried 500° F | 71 | 64 | 10 | 90 |
| 3 | Calcined 1,200° F | 67 | 64 | 4 | 96 |
| 4 | Steamed 900° F | 67 | 64 | 4 | 96 |

The above data show that precalcining or steaming the cobalt zeolite base appreciably improved the hydrothermal stability of the final preparation.

The catalysts of Examples 1, 3 and 4 were saturated with hydrogen sulfide at room temperature for a period of 2 hours and then tested for catalytic activity by hydrocracking a synthetic gas oil having the following properties:

| | | |
|---|---|---|
| Gravity | API | 24.6 |
| Boiling range | ° F | 400–812 |
| Sulfur content | wt. percent | 1.0 |

The test conditions were:

| | |
|---|---|
| ° F. | 650 |
| P.s.i.g. | 1000 |
| LHSV | 2.0 |
| CF $H_2$/B | 6000 |

Product collected during 26–42 hours on stream was distilled to determine the yields of 120–340° F. boiling gasoline. Results are shown in Table 2.

TABLE 2

| Catalyst of example | Catalyst preparation | 120–340° F. gasoline yield |
|---|---|---|
| 1 | Dried 140° F | 13.9 vol. percent feed. |
| 3 | Calcined 1,200° F | 26.3 vol. percent feed. |
| 4 | Steamed 900° F | 24.4 vol. percent feed. |

The above data show that precalcining or presteaming the zeolite base substantially improved the catalyst activity.

EXAMPLE 5

This example illustrates the effectiveness of the method of the invention catalysts for use in hydrotreating.

A cobalt hydrogen zeolite Y containing 6 percent CoO was heated to 1300° F. in 3 hours and held at that temperature for 16 hours. It was then mulled with 61.9 g. $Ni(NO_3)_2 \cdot 6H_2O$ (25.7% NiO) and 14.3 g. $NiCO_3$ (57.3% NiO) until a uniform powder formed. Then 92 g. $(NH_4)_6Mo_7O_{24} \cdot 4H_2O$ (82% $MoO_3$) was added and mulling was continued to mix uniformly. Finally, a boehmite paste, 385 g. (26% $Al_2O_3$), was added with sufficient water to form an extrudable paste. The boehmite paste contained about 0.8 m.e. nitric acid per gram of $Al_2O_3$ as a peptizing agent. The final mulled mixture was extruded through a 1/16-inch die, dried and calcined by heating to 870° F.

The catalyst was tested with a straight run gas oil feed having the following properties:

| | | |
|---|---|---|
| Gravity | ° API | 25.6 |
| Sulfur | wt. percent | 1.057 |
| Kjeldahl nitrogen | wt. percent | 0.2049 |
| Basic nitrogen | | 0.0801 |

D-1160 Engler 10 mm.:  °F.
  IBP ------------------------------------ 460
  Percent:
    10 ---------------------------------- 566
    30 ---------------------------------- 642
    50 ---------------------------------- 695
    70 ---------------------------------- 740
    90 ---------------------------------- 813
  Max. ---------------------------------- 881

The reactor charge was presulfided with a stream of 10% hydrogen sulfide in hydrogen while heating from room temperature to 700° F. Then the reactor was pressured to 1000 p.s.i.g. prior to introducing the feed. The temperature remained at 700° for 18 hours and then was increased to 740° F. for the next 3 days. Pressure, feed rate, and hydrogen rate remained constant at 1000 p.s.i.g., 1.0 LHSV, and 6000 c.f. $H_2$1B. Data from the test showed values of residual nitrogen and sulfur in the 500°+ distillation bottoms fraction of 0.008 and 0.0095, respectively, thus indicating the highly effective nature of the catalyst for denitrogenation and desulfurization.

EXAMPLE 13

This example illustrates a method which can be used for the preparation of a catalyst encompassed within the scope of this invention containing rare earth back exchanged ammonium zeolite X, nickel and molybdenum.

Two thousand grams of the sodium zeolite X containing about 20 mole percent $Na_2O$, 23 mole percent $Al_2O_3$ and 56 mole percent $SiO_2$ can be slurried with 2000 milliliters of an aqueous exchange solution at a pH of about 4 containing 1.5 pounds of the chlorides of cerium and lanthanum under agitation to improve contacting. The slurry is stirred and heated to about 200° F. for 2 hours. The zeolite is then collected by filtration washed with deionized distilled water and subjected to further exchange with fresh exchange solution as described above. The exchange is repeated for a third time after which the resultant rare earth zeolite X, which should contain less than 2 weight-percent $Na_2O$, is collected by filtration, dried by contacting at 250° F. for 2 hours and calcined by heating to 900° F. The calcined zeolite is then mechanically admixed with 10 grams of nickel carbonate, 41 grams of nickel nitrate, hexahydrate and 61 grams of ammonium molybdate in a pan muller for about 30 minutes. The peptized boehmite alumina described in Examples 1 through 4 (320 grams) is then added and the mulling is continued for an additional 30 minutes. About 30 milliliters of water is added to form an extrudable paste and the mixture is extruded through a 1/16-inch die, dried at 200° F. for 2 hours and calcined at 800° F. for 1 hour.

The resultant extrudates are then contacted with a stream of 10 percent hydrogen sulfide in hydrogen at atmospheric pressure of 200° F. for 2 hours to substantially sulfide the nickel and molybdenum.

EXAMPLE 7

A catalyst similar to that described in Example 6 can be prepared from magnesium zeolite L. Sodium zeolite L is subjected to the ammonium exchange procedures described in Example 6 after which the ammonium zeolite containing less than 2 weight-percent $Na_2O$ on a dry weight basis is recovered by filtration and dried at 250 °F. for 2 hours. The powdered zeolite is then contacted with 2000 milliliters of a 0.5 molar magnesium sulfate exchange solution with agitation at 200° F. for 30 minutes. The zeolite is separated from the solution by filtration, dried at 200° F. for 1 hour and calcined by heating to 900° F. The calcined zeolite is then re-exchanged with 2000 milliliters of fresh exchange solution having a 0.5 molar concentration of magnesium sulfate under agitation at 200° F. for 2 hours. The resultant zeolite is again separated by filtration and calcined as described and subjected to one additional exchange as described. Following the last exchange step the zeolite is dried at 250° F. for 2 hours and calcined by heating to 900° F. The dried zeolite is then mechanically admixed with undissolved constituents as follows, 10 grams of nickel carbonate, 45 grams of cobalt nitrate, and 60 grams of ammonium heptamolybdate. Mixing in a pan muller is continued for 30 minutes after which 320 grams of the peptized boehmite alumina sol described in Examples 1 through 4 is added to the muller. Mulling is continued for an additional 30 minutes until the mixture is rendered homogeneous. Thirty milliliters of water is added to the mixture to form an extrudable paste and the resultant paste is extruded through a 1/16-inch die, dried and calcined as described in Example 6. The calcined extrudates and then contacted at 100° F. with a solution of 2% carbon bisulfide in kerosene passed over to the catalyst at a rate of 0.2 LHSV for 2 hours to form an active sulfided catalyst.

EXAMPLE 8

An active hydrocracking catalyst can be prepared from rare earth zeolite Y within the scope of this invention as follows: The rare earth zeolite Y is prepared by contacting sodium zeolite Y with ammoniacal exchange solution as described in Example 6. The resultant ammonium form of the zeolite Y containing less than 2 weight-percent $Na_2O$ is then exchanged as described in Example 6 with an exchange solution containing the chlorides of cerium and lanthanum. As described in Example 6, the ammonium zeolite Y is exchanged three times with the rare earth exchange solution with the exception that the zeolite is calcined intermediate each exchange step. This calcination can be effected by separating the exchanged zeolite from the supernatant exchange medium by filtration, drying at 200° F. for 2 hours and calcination by heating to 900° F. The rare earth back exchanged Y zeolite is then finally dried at 250° F. for 2 hours and calcined by heating to 900° F. The calcined zeolite is then mechanically admixed with nickel, cobalt and molybdenum as described in Example 14 and sulfided by contacting with a stream of 10% hydrogen sulfide in hydrogen at 100° F. for 2 hours to form an active sulfided catalyst.

I claim:
1. A method of making a crystalline aluminosilicate zeolite catalyst having not more than about 3 percent of alkali metal in said zeolite comprising incorporating a stabilizing amount of at least one stabilizing cation selected from iron, cobalt and nickel in the ammonium or hydrogen form of the zeolite by ion exchange, subjecting the zeolite-stabilizing cation combination to a pretreatment consisting of calcination at a temperature within the range of about 1200 to about 1800° F., steaming at a temperature within the range of about 900 to about 1200° F., or a combination of the two, incorporating a hydrogenation component selected from the metals oxides of Groups V, VI and VIII of the Periodic Chart in the pretreated zeolite-stabilizing cation combination and drying and calcining the resulting composite.

2. The method of claim 1 wherein said zeolite-stabilizing cation combination is first calcined at a temperature of about 600 to 1300° F. and is then recalcined at a temperature of about 1400 to 1800° F.

3. The method of claim 1 wherein said stabilizing cation is selected from cobalt and nickel incorporated into said aluminosilicate by ion exchange in an amount within the range of about 0.1 to about 20 weight percent based on the elemental metal, said hydrogenation component is selected from molybdenum, tungsten, and palladium and said pretreatment comprises calcination of said aluminosilicate-stabilizing cation combination at a temperature within the range of about 1200 to about 1800° F. for at least about one-half hour.

4. The method of intimately contacting the hydrogen and/or ammonium exchanged form of a crystalline alkali metal aluminosilicate containing less than about 3 weight percent of said alkali metal with an aqueous ion exchange solution containing at least one stabilizing cation selected from the iron, cobalt and nickel ions and replacing at least 20% of the cations of said aluminosilicate with said stabilizing ion, calcining the resultant exchanged aluminosilicate at a temperature of about 500 to about 1800° F. for about one-half to about 30 hours, incorporating into the thus calcined zeolite from about 0.1 to about 20 weight percent of at least one active component selected from the metals, oxides and sulfides of Groups V, VI and VIII of the Periodic Chart, and activating the resultant aluminosilicate at a temperature of at least about 1200° F. for at least about one-half hour.

5. The method of claim 4 wherein said calcining is effected at a temperature of about 1200 to about 1800° F. for about 4 to about 16 hours, said active component is selected from Groups VI and VIII, the combination of said active component and said aluminosilicate is activated at a temperature of about 500 to about 1500° F. for about one-half to about 12 hours and the thus activated aluminosilicate is contacted with at least one of hydrogen sulfide and carbon disulfide at conditions sufficient to convert said active component to the corresponding sulfide.

6. The method of claim 4 wherein the said resultant exchanged aluminosilicate is calcined by a multi-step procedure including the steps of first subjecting said exchanged aluminosilicate to a temperature within the range of from about 600 to about 1300° F., followed by subjecting the thus treated aluminosilicate to a second temperature within the range of about 1400 to about 1800° F.

7. The method of exchanging at least about 20 percent of the cations of a hydrogen and/or ammonium exchanged sodium zeolitic aluminosilicate having a silica-to-alumina ratio of at least about 3, and containing less than about 3 weight percent sodium with at least one stabilizing cation selected from iron, cobalt and nickel, intimately contacting the resultant exchanged aluminosilicate with steam at a temperature within the range of about 900 to about 1200° F. for a period of about one-half to about 30 hours, incorporating into the resultant aluminosiliciate about 0.1 to about 20 weight percent of at least one active component selected from the metals, sulfides and oxides of Groups V, VI, and VIII of the Periodic Chart, and calcining the active component containing aluminosilicate at a temperature of at least about 500° F. for about one-half to about 12 hours.

8. The method of claim 7 wherein said stabilizing cation is selected from nickel and cobalt ions and comprises about 2 to about 15 weight percent of the finished catalyst, said active component is selected from Groups VI and VIII and said active component containing aluminosilicate is calcined at a temperature of about 500 to about 1500° F. for a period of about one-half to about 12 hours.

9. The catalytic composition formed on exchanging at least one stabilizing cation selected from iron, cobalt and nickel with at least 20% of the cations of a zeolitic aluminosilicate formed by the ion exchange of an alikali metal aluminosilicate with one of ammonium and hydrogen ions to a degree sufficient to form an exchange aluminosilicate having an alkali metal ion content of less than about 3 weight percent by contacting said exchanged aluminosilicate in the absence of intermediate calcination with an aqueous ion exchange solution of at least one stabilizing ion selected from iron, cobalt and nickel under conditions sufficient to replace at least 20% of the cations of said aluminosilicate with said stabilizing cation, subjecting the resultant aluminosilicate-stabilizing element combination to one of (a) calcination at a temperature within the range of about 500 to about 1800° F. for at least about one-half hour, and (b) steaming at a temperature within the range of about 900 to about 1200° F. for at least about one-half hour, incorporating into the thus treated zeolite an amount of about 0.1 to about 20 weight percent of at least one active component selected from the metals, oxides and sulfides of Groups V, VI and VIII of the Periodic Chart, and activating the resultant aluminosilicate-active component combination at a temperature of at least about 500° F. for at least about one-half hour.

10. The composition of claim 9 wherein said stabilizing cation is selected from cobalt and nickel, said aluminosilicate-stabilizing cation combination is calcined at a temperature of about 1200 to about 1800° F. for a period of about one-half to about 30 hours, said hydrogenation componen is selected from the metals, oxides and sulfides of Groups VI and VIII of the Periodic Chart and the resultant aluminosilicate- cation-hydrogenation component combination is activated at a temperature within the range of about 500 to about 1500° F. for about one-half to about 12 hours.

11. The composition of claim 10 wherein the concentration of said stabilizing cation is about 2 to about 15 weight percent based on the elemental metal and the concentration of said hydrogenation component is within the range of about 0.1 to about 20 weight percent determined as the free metal.

12. The composition produced by the method of claim 4 containing less than about 3 weight-percent sodium, about 2 to about 15 weight percent of said stabilizing cation determined as the elemental metal and about 0.1 to about 20 weight percent of said active component determined as the free metal.

13. The composition produced by the method of claim 7.

14. The catalyst prepared by the method of claim 1.

15. The hydrocarbon conversion catalyst prepared by contacting the ammonium and/or hydrogen form of a large pore crystalline aluminosilicate zeolite having an average pore size of at least about 5 A. and containing less than 3 weight-percent alkali metal determined as the corresponding oxide with an aqueous ion exchange medium having at least a 0.1 molar concentration of at least one water soluble salt of at least one of iron, cobalt, nickel, magnesium, calcium and the rare earth cations for a period of at least about 5 minutes under conditions sufficient to incorporate at least about 0.5 weight-percent of said cation into said aluminosilicate drying and calcining the resultant exchanged aluminosilicate at a temperature within the range of 1200 to 1800° F. and combining the resultant calcined aluminosilicate with at least one hydrogenation component selected from molybdenum, tungsten and the Group VIII noble metals, oxides and sulfides, and calcining the resultant combination of said aluminosilicate and the said hydrogenation component at a temperature of at least about 500° F.

16. The composition of claim 15 wherein said crystalline aluminosilicate is selected from zeolites X, Y, A, L and mordenite, said cation in said exchange medium is selected from at least one of iron, cobalt, nickel, magnesium, calcium, cerium, lanthanum, praseodymium and neodymium, said aluminosilicate is contacted with said aqueous ion exchange medium having a concentration of a water soluble salt of said cation within the range of about 0.2 to about 3 molar for a period of at least about 5 minutes followed by drying and calcination at said temperature within the range of 1200 to about 1800° F., the resultant calcined aluminosilicate is combined with at least one molybdenum, tungsten and palladium metals and metal compounds convertible to the corresponding oxides upon calcination in an oxygen containing atmosphere in amounts within the range of about 0.1 to about 20 weight-percent based on the corresponding oxide and at least about 5 weight-percent of an alumina-containing binder, and the resultant combination of said binder, hydrogenation component, cation and aluminosilicate is calcined at a temperature within the range of 500 to about 1500° F. and sulfided by contacting with at least one of hydrogen sulfide, carbon bisulfide and elemental sulfur.

17. The composition of claim 16 wherein said exchanged aluminosilicate is calcined at said temperature within the range of 1200–1800° F. and then reexchanged at least one additional time with an aqueous ion exchange solution having a concentration of at least 0.1 molar of a water soluble salt of at least one of iron, cobalt, nickel, magnesium, calcium, cerium, lanthanum, praseodymium and neodymium ions followed by drying and calcination at a temperature within a range of 1200 to about 1800° F. for a period of at least one-half hour, the resultant calcined aluminosilicate containing at least about 2 weight-percent of said cation determined as the corresponding oxide is combined by one of impregnation and mechanical admixture with at least one hydrogenation component selected from molybdenum, tungsten and palladium metals, oxides and sulfides in amounts corresponding to at least about 2 weight-percent on a dry weight basis and about 5 to about 70 weight-percent of at least one of peptized alumina and silica-stabilized alumina, and the resultant combination is activated by calcination at a temperature within the range of about 500 to 1500° F. and sulfided by contacting with at least one of hydrogen sulfide, carbon bisulfide and elemental sulfur under conditions sufficient to convert substantially all of said hydrogenation component to the corresponding sulfide.

18. The composition of claim 15 wherein said zeolite is selected from natural and synthetic faujasite zeolites and zeolites A, L and mordenite, said cation in said ion exchange medium is at least one of cobalt and nickel and said aqueous ion exchange medium contains at least about 0.2 to about 3 molar concentration of at least one of the nitrates, sulfates, halides and carbonates of cobalt and/or nickel, said hydrogenation component is molybdenum incorporated into said aluminosilicate by mechanical admixture of at least one of molybdenum, molybdenum oxide and thermally decomposable undissolved molybdenum compounds, and said composition contains about 2 to about 15 weight-percent of said cation determined as the corresponding oxide and about 0.1 to about 20 weight-percent of said hydrogenation component determined as the corresponding oxide.

19. The composition of claim 15 wherein said aluminosilicate is ammonium zeolite Y containing less than 2 weight-percent $Na_2O$, said ammonium zeolite Y is contacted for at least about 5 minutes with at least about a two-fold volumetric excess of a nickel nitrate ion exchange solution being at least about 0.1 molar in concentration sufficient to incorporate at least about 2 weight-percent nickel ion into said aluminosilicate determined as the corresponding oxide, the resultant exchanged zeolite is dried and calcined at said temperature within the range of 1200 to about 1800° F. for a period of at least about one-half hour, the resultant, admixture is mechanically admixed with ammonium heptamolybdate, nickel carbonate and nickel nitrate and a peptized alumina-containing binder in amounts sufficient to provide a final composition containing about 5 to about 3 weight-percent alumina, about 4 to about 8 weight-percent nickel determined as the corresponding oxide and about 2 to about 20 weight-percent molybdenum oxide, the resultant admixture is activated by calcination in an oxygen containing atmosphere at a temperature within the range of 500 to about 1500° F. for a period of at least about one-half hour and sulfided by contacting with at least one of hydrogen sulfide, carbon bisulfide and elemental sulfur under conditions sufficient to convert substantially; all of said nickel and molybdenum to the corresponding sulfides.

References Cited
UNITED STATES PATENTS

| | | | |
|---|---|---|---|
| 3,197,398 | 7/1965 | Young | 208—111 |
| 3,352,796 | 11/1967 | Kimberlin, Jr. et al. | 252—455 Z |
| 3,391,088 | 7/1968 | Plank et al. | 252—455 X |
| 3,393,147 | 7/1968 | Dwyer et al. | 208—120 |
| 3,402,996 | 9/1968 | Maher et al. | 252—455 X |
| 3,407,148 | 10/1968 | Eastwood et al. | 252—455 |
| 3,462,377 | 9/1969 | Plank et al. | 252—455 |

CARL F. DEES, Primary Examiner

U.S. Cl. X.R.

208—111